(12) United States Patent
Chu et al.

(10) Patent No.: US 9,672,813 B2
(45) Date of Patent: Jun. 6, 2017

(54) SYSTEMS AND METHODS FOR CONFIGURING MATCHING RULES RELATED TO VOICE INPUT COMMANDS

(71) Applicant: Tencent Technology (Shenzhen) Company Limited, Shenzhen (CN)

(72) Inventors: Pan Chu, Shenzhen (CN); Hao Xu, Shenzhen (CN); Fei Wang, Shenzhen (CA); Guiping Han, Shenzhen (CN); Ling Liao, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/798,557

(22) Filed: Jul. 14, 2015

(65) Prior Publication Data

US 2015/0325234 A1    Nov. 12, 2015

Related U.S. Application Data

(63) Continuation of application No. PCT/CN2014/081763, filed on Jul. 7, 2014.

(30) Foreign Application Priority Data

Jul. 8, 2013  (CN) .......................... 2013 1 0284410

(51) Int. Cl.
*G10L 17/00* (2013.01)
*G10L 15/06* (2013.01)
(Continued)

(52) U.S. Cl.
CPC .............. *G10L 15/06* (2013.01); *G10L 17/22* (2013.01); *G10L 19/173* (2013.01); *H04L 51/12* (2013.01);
(Continued)

(58) Field of Classification Search
CPC ... G10L 19/173; G10L 21/0364; G10L 21/04; H04L 51/12; H04L 51/28; H04L 51/36
(Continued)

(56) References Cited

U.S. PATENT DOCUMENTS 7,099,823 B2 * 8/2006 Takamizawa ......... G10L 19/173
                                                       704/208
7,231,428 B2 * 6/2007 Teague ................. G06Q 10/107
                                                       709/206
(Continued)

FOREIGN PATENT DOCUMENTS

CN        1512402 A      7/2004
CN      101269638 A      9/2008
(Continued)

OTHER PUBLICATIONS

Patent Cooperation Treaty, International Search Report and Written Opinion of the International Searching Authority, mailed Oct. 15, 2014, in PCT/CN2014/081763.
(Continued)

*Primary Examiner* — Vijay B Chawan
(74) *Attorney, Agent, or Firm* — Jones Day (57) ABSTRACT

Systems, devices and methods are provided for configuring matching rules related to voice input commands. For example, a first mapping relation between one or more first original terms in a preset term database and one or more first identification terms is established; the first mapping relation is stored in a first mapping relation table; one or more first voice input commands are configured for the first identification terms or one or more first statements including the first identification terms; and a second mapping relation between the first identification terms or the first statements and the first voice input commands is stored into a second mapping relation table.

15 Claims, 4 Drawing Sheets

(51) Int. Cl.
    *G10L 19/16*     (2013.01)
    *G10L 17/22*     (2013.01)
    *G10L 21/04*     (2013.01)
    *H04L 12/58*     (2006.01)
    *G10L 21/0364*     (2013.01)

(52) U.S. Cl.
    CPC .......... *G10L 21/0364* (2013.01); *G10L 21/04* (2013.01); *H04L 51/28* (2013.01)

(58) Field of Classification Search
    USPC .............. 704/208, 219, 221, 230, 246, 270; 707/999.1; 709/206, 207
    See application file for complete search history.

(56) References Cited

U.S. PATENT DOCUMENTS

| | | | |
|---|---|---|---|
| 7,363,218 B2* | 4/2008 | Jabri | ..................... G10L 19/173 |
| | | | 704/219 |
| 2002/0010715 A1* | 1/2002 | Chinn | ....................... G06F 3/16 |
| | | | 715/236 |
| 2004/0172402 A1* | 9/2004 | Jabri | ..................... G10L 19/173 |
| | | | 707/999.1 |
| 2007/0185702 A1 | 8/2007 | Harney et al. | |
| 2008/0104037 A1* | 5/2008 | Bierner | ............... G06F 17/3064 |
| | | | 707/999.003 |
| 2008/0177726 A1* | 7/2008 | Forbes | ................... G06Q 30/02 |
| | | | 707/999.005 |
| 2009/0018830 A1 | 1/2009 | Emmanuel | |

FOREIGN PATENT DOCUMENTS

| | | |
|---|---|---|
| CN | 101599270 A | 12/2009 |
| CN | 103187079 A | 7/2013 |

OTHER PUBLICATIONS

Patent Cooperation Treaty, International Preliminary Report on Patentability, issued Jan. 12, 2016, in PCT/CN2014/081763.

* cited by examiner

SYSTEMS AND METHODS FOR CONFIGURING MATCHING RULES RELATED TO VOICE INPUT COMMANDS

CROSS-REFERENCES TO RELATED APPLICATIONS

This application is a continuation of International Application No. PCT/CN2014/081763, with an international filing date of Jul. 7, 2014, now pending, which claims priority to Chinese Patent Application No. 201310284410.9, filed Jul. 8, 2013, both applications being incorporated by reference herein for all purposes.

BACKGROUND OF THE INVENTION

Certain embodiments of the present invention are directed to computer technology. More particularly, some embodiments of the invention provide systems and methods for voice input. Merely by way of example, some embodiments of the invention have been applied to configuration of matching rules. But it would be recognized that the invention has a much broader range of applicability.

With the development of terminal equipments, a terminal can support more and more human-computer interaction modes, e.g., a voice input mode. For example, a terminal equipment can identify the intention of a user via voice information input by the user. Currently, terminal equipments often adopt a voice input command matching method to match a voice input command corresponding to the voice information input by the user so as to execute an operation corresponding to the voice input command.

The above-noted conventional technology has some disadvantages. For example, a terminal equipment can establish a mapping relation between each voice input command and a corresponding statement for configuration of matching rules related to voice input commands. Since a voice input command may correspond to multiple statements of different expressions, the terminal equipment often needs to, for each voice input command, establish mapping relations with multiple statements of different expressions respectively, resulting in low efficiency of configuring the voice input command matching rules.

Hence it is highly desirable to improve the techniques for configuring matching rules related to voice input commands.

BRIEF SUMMARY OF THE INVENTION

According to one embodiment, a method is provided for configuring matching rules related to voice input commands. For example, a first mapping relation between one or more first original terms in a preset term database and one or more first identification terms is established; the first mapping relation is stored in a first mapping relation table; one or more first voice input commands are configured for the first identification terms or one or more first statements including the first identification terms; and a second mapping relation between the first identification terms or the first statements and the first voice input commands is stored into a second mapping relation table.

According to another embodiment, a device is provided for configuring matching rules related to voice input commands. The device includes: an establishing unit configured to establish a first mapping relation between one or more first original terms in a preset term database and one or more first identification terms; a storing unit configured to store the first mapping relation in a first mapping relation table; and a configuring unit configured to configure one or more first voice input commands for the first identification terms or one or more first statements including the first identification terms. The storing unit is further configured to store a second mapping relation between the first identification terms or the first statements and the first voice input commands into a second mapping relation table.

According to yet another embodiment, a non-transitory computer readable storage medium includes programming instructions for configuring matching rules related to voice input commands. The programming instructions are configured to cause one or more data processors to execute certain operations. For example, a first mapping relation between one or more first original terms in a preset term database and one or more first identification terms is established; the first mapping relation is stored in a first mapping relation table; one or more first voice input commands are configured for the first identification terms or one or more first statements including the first identification terms; and a second mapping relation between the first identification terms or the first statements and the first voice input commands is stored into a second mapping relation table.

For example, the devices and methods disclosed herein are configured to establish a mapping relation between a voice input command and one or more corresponding identification terms and/or one or more statements including the identification terms to avoid repeatedly establishing mapping relations between a same voice input command and multiple statements with similar meanings for improving efficiency for configuration of matching rules related to voice input commands.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
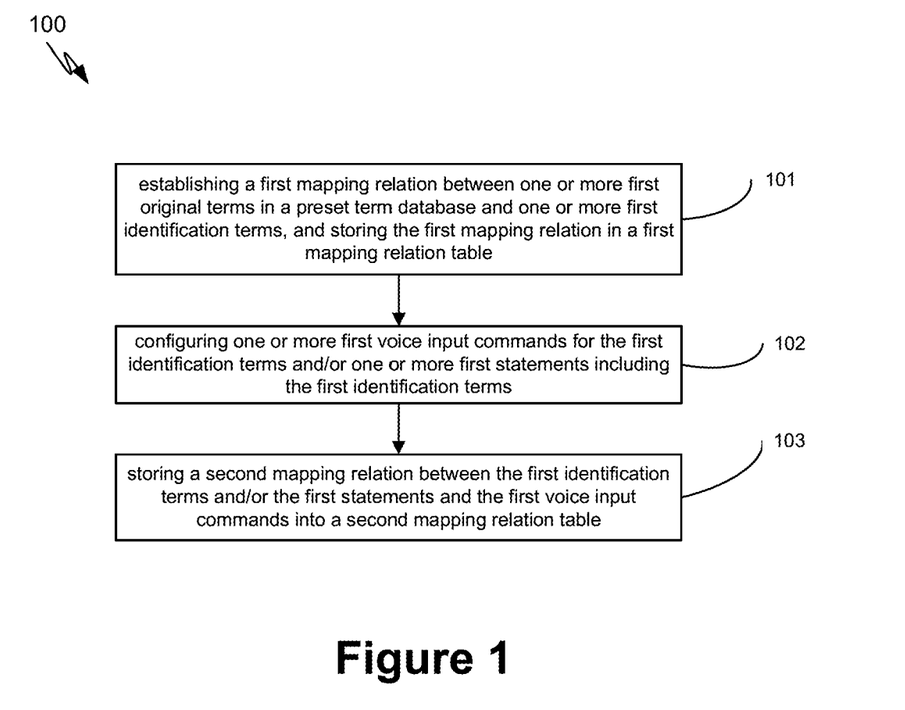
FIG. 1 is a simplified diagram showing a method for configuring matching rules related to voice input commands according to one embodiment of the present invention.

FIG. 1 is a simplified diagram showing a method for configuring matching rules related to voice input commands according to one embodiment of the present invention. The diagram is merely an example, which should not unduly limit the scope of the claims. One of ordinary skill in the art would recognize many variations, alternatives, and modifications. The method 100 includes at least processes 101-103.

According to one embodiment, the process S101 includes: establishing a mapping relation between one or more original terms in a preset term database and one or more identification terms and storing the mapping relation in a first mapping relation table. For example, the original terms (e.g., words) in the preset term database include terms used when a user inputs voice information. As an example, one or more corresponding identification terms can be preconfigured for each original term in the preset term database according to term meanings of the original terms, where the term meaning similarity between each original term and the corresponding identification terms meets a preset condition. In another example, the preset condition includes: each original term and the corresponding identification terms include a same or similar term meaning. In yet another example, identification terms corresponding to the original terms that have a meaning of inquiry can be preconfigured to inquire. In yet another example, the identification terms corresponding to the original terms that have a meaning of inquiry, such as search, find, etc., are preconfigured to inquire, and then mapping relations between find and inquire and between search and inquire are established respectively. If the voice information input by the user includes target terms such as find, search, inquire, etc., the terminal equipment can identify the target terms as inquire, according to some embodiments.

According to another embodiment, the process S102 includes: configuring one or more voice input commands for the identification terms or one or more statements including the identification terms. For example, the voice input commands include triggering commands corresponding to functions to be implemented by the terminal equipment. As an example, the voice input commands include functional triggering commands, e.g., inquiring weather, inquiring contacts, etc. In another example, a voice input command can be configured for a certain identification term and the corresponding voice input command also can be configured for different statements each including one or more identification terms. In yet another example, if a certain identification term corresponds to inquiry, the voice input commands corresponding to the identification term of inquiry is configured to one of the commands: inquiring weather, inquiring television programs, etc., according to actual user needs. In yet another example, if there are four identification terms: inquiry, weather, contacts and television programs, the statements including the four identification terms are: inquire weather, inquire contacts and inquire television programs. As another example, the voice input commands configured for different statements respectively are a command of inquiring weather, a command of inquiring contacts and a command of inquiring television programs.

According to yet another embodiment, the process S103 includes: storing a second mapping relation between the identification terms and/or the statements and the voice input commands into a second mapping relation table. For example, the mapping relation between each original term in the preset term database and the corresponding identification terms and the mapping relation between each identification terms and/or each statement and the corresponding voice input command can be stored in the same mapping relation table, or in different mapping relation tables. That is, the second mapping relation table and the first mapping relation table can be the same or different.

Figure 2:
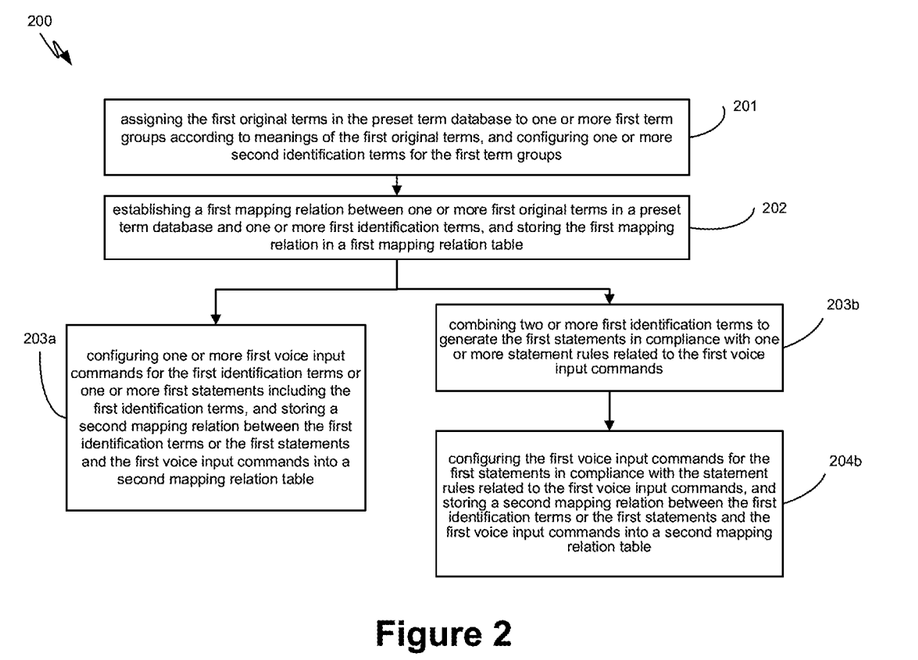
FIG. 2 is a simplified diagram showing a method for configuring matching rules related to voice input commands according to one embodiment of the present invention.

FIG. 2 is a simplified diagram showing a method for configuring matching rules related to voice input commands according to one embodiment of the present invention. The diagram is merely an example, which should not unduly limit the scope of the claims. One of ordinary skill in the art would recognize many variations, alternatives, and modifications. The method 200 includes at least processes 201, 202, 203a, 203b, and 204b.

According to one embodiment, the process S201 includes: assigning the original terms in the preset term database to one or more term groups according to meanings of the original terms and one identification terms is configured to each term group respectively. For example, the term meaning similarity between each original term in each term group and the identification terms of the term group meets the preset condition. As an example, the original terms in the preset term database particularly include terms used when the user inputs voice information. In another example, the identification terms corresponding to the original terms that have a meaning of weather conditions is configured to weather conditions. Then the original terms including the meaning of weather conditions are acquired from the preset term database, e.g., weather situation, weather status, weather forecasts, etc. That is, the original terms included in the term group with the meaning of weather conditions include weather situation, weather conditions, weather status, and weather forecast.

According to another embodiment, before the process S201, the method 200 includes a process for assigning the original terms in the preset term database to one or more term groups according to parts of speech related to the original terms. For example, the parts of speech of all the original terms in each term group are the same. Particularly, all the terms can be assigned into a plurality of groups according to different types of parts of speech, such as verbs, nouns, adjectives etc. As an example, the nouns, such as weather, contacts, music, etc. are assigned into a noun group and the verbs, such as inquire, calculate, delete, end, etc. are assigned into a verb group. As another example, all original terms are assigned into different term groups in advance according to the parts of speech. In some embodiments, then, according to the term meanings, the terminal equipment further divides the term groups into subgroups according to the term meanings to reduce the times of comparison related to the term meaning similarity between different terms, so as to further improve efficiency of configuring the voice input command matching rules, compared with directly assigning the original terms to multiple term groups according to the term meanings. For example, the process S201 includes: dividing a term group into one or more subgroups according to meanings of the original terms in the term group, and configuring one or more identification terms to the subgroups, where a second meaning similarity between one or more original terms in a subgroup and a identification term configured for the subgroup satisfies a preset second condition.

According to yet another embodiment, the process S202 includes: establishing a first mapping relation between one or more original terms in a preset term database and one or more identification terms. For example, if the original terms in a certain term group include end, interrupt and stop, and the preconfigured identification term of the term group corresponds to interrupt. The mapping relations between end and interrupt and between stop and interrupt are established respectively, according to some embodiments. For example, if the voice information input by the user includes target terms of end, stop, interrupt, etc., the terminal equipment can identify the target terms as interrupt.

In one embodiment, the process S203a includes: configuring one or more voice input commands for the identification terms or one or more statements including the identification terms and storing a second mapping relation between the identification terms or the statements and the voice input commands into a second mapping relation table. For example, if the identification term of a certain term group is inquire, the voice input command corresponding to the identification term of inquiry can be configured into one of the following commands: inquiring weather, inquiring television program, inquiring contacts, etc., according to user needs.

In another embodiment, the process S203b includes: combining two or more identification terms to generate the statements in compliance with one or more statement rules related to the voice input commands. In some embodiments, the process S203b and the process S203a are executed in parallel. For example, the identification terms of the term groups are: inquire, end, calculation, weather, contacts and television programs respectively. When at least two of the identification terms are combined, the statements of inquiring weather, inquiring the contacts, inquiring the television programs, ending weather, calculating the contacts, etc. can be formed, in some embodiments. For example, the three statements of inquiring weather, inquiring the contacts and inquiring the television programs are in compliance with the voice input command rules, so that the generated statements in compliance with the voice input command rules are inquiring weather, inquiring the contacts and inquiring the television programs.

In yet another embodiment, after the process S203b, the method 200 further includes the process S204b for configuring the voice input commands for the statements in compliance with the statement rules related to the voice input commands and storing a second mapping relation between the statements and the voice input commands into a second mapping relation table. For example, the voice input commands include triggering commands corresponding to one or more functions to be implemented by the terminal equipment. In another example, the voice input commands include functional commands of inquiring contacts, inquiring music, etc. In yet another example, the mapping relation between each original term in the preset term database and the corresponding identification terms and the mapping relation between each identification terms and/or each statement and the corresponding voice input command can be stored in the same mapping relation table, or in different mapping relation tables. That is, the second mapping relation table and the first mapping relation table can be the same or different.

In yet another embodiment, the terminal equipment monitors whether there is a newly added term in real time, and when the newly added term that has no mapping relation with any identification term is detected, an identification term corresponding to the newly added term is acquired and then the mapping relation between the newly added term and the corresponding identification term is established and is stored in the first mapping relation table. For example, the identification term corresponding to the newly added term can be acquired according to the term meaning. The conventional technology often involves acquiring all statements that include the newly added term and are in compliance with the voice input command statement rules and then establishing the mapping relations between all the statements and the corresponding voice input commands respectively so as to complete addition of the newly added word. In comparison, with the execution of the method 200, the mapping relation between the newly added term and the corresponding identification term needs to be established only once, so as to improve the efficiency of configuring the voice input command matching rules.

According to some embodiments, the original terms stored in the preset term database include inquire, find, search, weather conditions, weather forecast and television programs, the terminal equipment assigns the original terms into three term groups according to the term meanings and configures the identification terms of the three term groups to inquire, weather forecast and television programs respectively. For example, the terminal equipment determines that the term meanings of find, search and inquire are similar, and the term meanings of weather conditions and weather forecast are similar. Then the terminal equipment establishes the mapping relations between find, search and inquiry, and establishes the mapping relation between weather conditions and weather forecast, according to certain embodiments. The statements of inquiring weather forecast and inquiring the television programs, which are in compliance with different voice input command statement rules respectively, are generated according to the identification terms of the three term groups, as an example. The voice input command corresponding to the statement of inquiring weather forecast is configured to a command of triggering the terminal equipment to execute an operation of inquiring weather, for example. The voice input command corresponding to the statement of inquiring the television programs is configured to a command of triggering the terminal equipment to execute an operation of inquiring the television programs, in another example. The mapping relations between the statements of inquiring weather forecast and inquiring the television program and the corresponding voice input commands are stored in the mapping relation table, where different voice input commands can be identified by different marks so as to be distinguished, according to some embodiments.

The conventional technology often establishes the mapping relations respectively between a statement of inquiring weather forecast, a statement of inquiring weather conditions, a statement of finding weather forecast, a statement of finding weather conditions, a statement of searching weather forecast and a statement of searching weather conditions and the command of triggering the terminal equipment to execute the operation of inquiring weather. In addition, the conventional technology usually establishes the mapping relations respectively between a statement of inquiring the television program, a statement of finding the television program and a statement of searching the television program and the command of triggering the terminal equipment to execute the operation of inquiring the television program in the configuring process. In comparison, the execution of the method 200 improves the efficiency of configuring the voice input command matching rules, according to certain embodiments.

According to another embodiment, a matching process of the voice information input by the user, which is implemented by the voice input command matching rules, includes: receiving voice information input by a user, the voice information including one or more target terms; acquiring one or more identification terms corresponding to the target terms in the voice information based on at least information associated with the first mapping relation table; combining the identification terms corresponding to the target terms to generate one or more statements; acquiring one or more voice input commands corresponding to the statements based on at least information associated with the second mapping relation table; and executing one or more operations corresponding to the voice input commands. For example, when the identification terms corresponding to the target terms are combined to generate one or more statements according to an order of the target terms in the voice information.

According to yet another embodiment, when the voice information input by the user includes find weather conditions. For example, the terminal equipment acquires the target terms of find and weather conditions in the voice information, and then acquires the identification terms of inquiry and weather forecast, which correspond to the target terms of find and weather conditions respectively, from the voice input command matching rules. As an example, the terminal equipment arranges the identification terms according to the order of the target terms in the voice information to form the statement of inquiring weather forecast. In another example, the voice input command of triggering the terminal equipment to execute the operation of inquiring weather, which corresponds to the statement of inquiring weather forecast, is acquired. In yet another example, the terminal equipment executes the operation of inquiring weather according to the command. The identification terms are not arranged according to the order of the target terms in the voice information to form the statement, in some embodiments. For example, the statement including the identification terms corresponds to inquiring weather forecast, and then the voice input command of triggering the terminal equipment to execute the operation of inquiring weather, which corresponds to the statement of inquiring weather forecast, is acquired. In another example, the terminal equipment executes the operation of inquiring weather according to the command.

Figure 3:
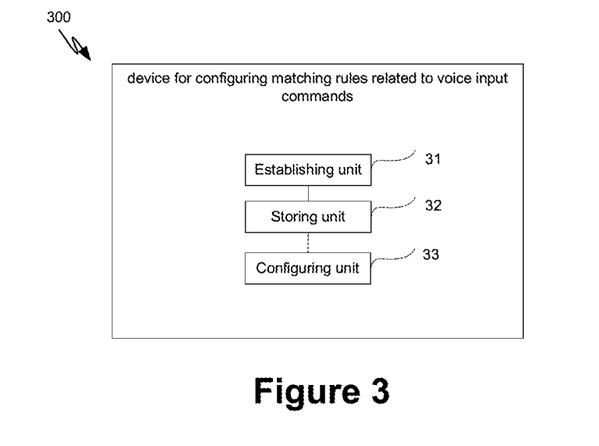
FIG. 3 is a simplified diagram showing a device for configuring matching rules related to voice input commands according to one embodiment of the present invention.

FIG. 3 is a simplified diagram showing a device for configuring matching rules related to voice input commands according to one embodiment of the present invention. The diagram is merely an example, which should not unduly limit the scope of the claims. One of ordinary skill in the art would recognize many variations, alternatives, and modifications. The device 300 includes: an establishing unit 31, a storing unit 32 and a configuring unit 33. For example, the device 300 includes a terminal equipment, such as a mobile phone, a computer, a laptop, etc.

According to one embodiment, the establishing unit 31 is configured to establish a first mapping relation between one or more first original terms in a preset term database and one or more first identification terms. For example, the storing unit 32 is configured to store the first mapping relation in a first mapping relation table. In another example, the configuring unit 33 is configured to configure one or more first voice input commands for the first identification terms and/or one or more first statements including the first identification terms.

According to another embodiment, the storing unit 32 also is configured to store a second mapping relation between the first identification terms and the corresponding first voice input commands and/or between the first statements and the corresponding first voice input commands into a second mapping relation table. In some embodiments, the device 300 is implemented to execute the method 100.

Figure 4:
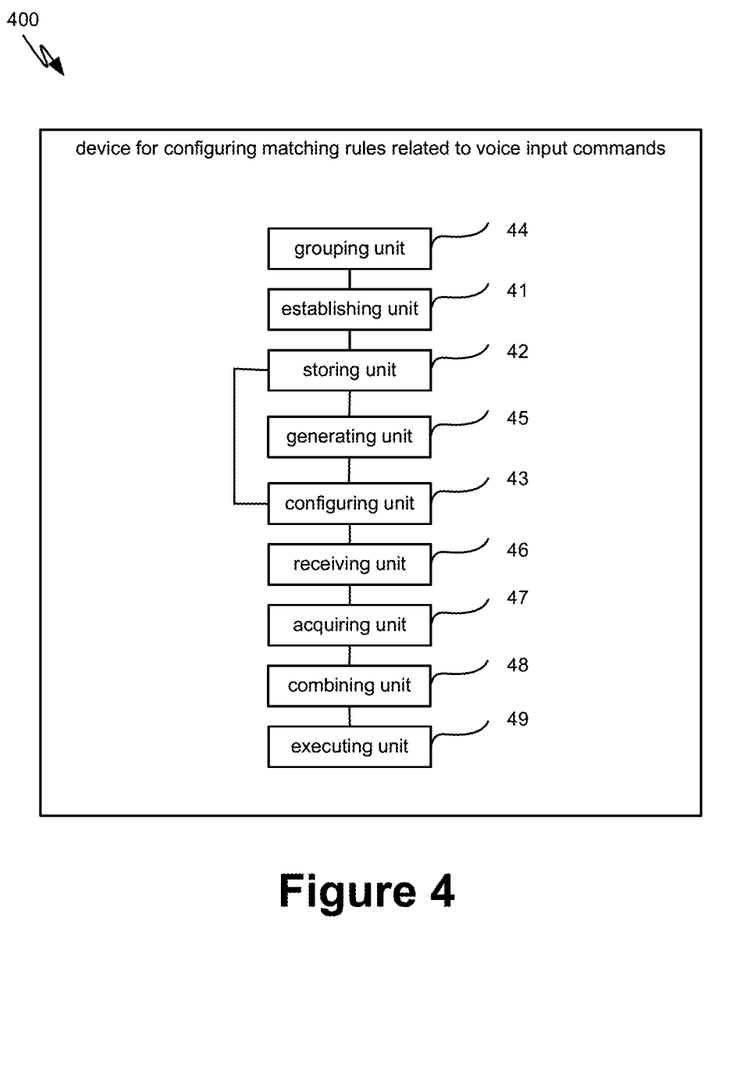
FIG. 4 is a simplified diagram showing a device for configuring matching rules related to voice input commands according to another embodiment of the present invention.

FIG. 4 is a simplified diagram showing a device for configuring matching rules related to voice input commands according to another embodiment of the present invention. The diagram is merely an example, which should not unduly limit the scope of the claims. One of ordinary skill in the art would recognize many variations, alternatives, and modifications. The device 400 includes: an establishing unit 41, a storing unit 42, a configuring unit 43, a grouping unit 44, a generating unit 45, a receiving unit 46, an acquiring unit 47, a combining unit 48 and an executing unit 49. For example, the device 400 includes a terminal equipment, such as a mobile phone, a computer, a laptop, etc.

According to one embodiment, the establishing unit 41 is configured to establish a first mapping relation between one or more first original terms in a preset term database and one or more first identification terms. For example, the storing unit 42 is configured to store the first mapping relation in a first mapping relation table. In another example, the configuring unit 43 is configured to configure one or more first voice input commands for the first identification terms or one or more first statements including the first identification terms. The storing unit 42 also is configured to store a second mapping relation between the first identification terms and the corresponding first voice input commands and/or between the first statements and the corresponding first voice input commands into a second mapping relation table.

According to another embodiment, the grouping unit 44 is configured to assign the first original terms in the preset term database to one or more first term groups according to meanings of the first original terms and configure one or more second identification terms for the first term groups, where a first meaning similarity between the first original terms in a second term group and a third identification term configured for the second term group satisfies a preset first condition, the second term group being among the first term groups, the third identification term being among the second identification terms. For example, the establishing unit 41 is configured to establish a third mapping relation between the first original terms in the second term group and the third identification term configured for the second term group. In another example, the grouping unit 41 also is configured to assign the first original terms in the preset term database to one or more third term groups according to parts of speech related to the first original terms, wherein parts of speech of one or more second original terms in a fourth term group are the same, the fourth term group being among the third term groups. For example, the grouping unit 41 is configured to divide the second term group into one or more first subgroups according to meanings of the first original terms in the second term group and configure one or more third identification terms to the first subgroups, wherein a second meaning similarity between one or more third original terms in a second subgroup and a fourth identification term configured for the second subgroup satisfies a preset second condition, the second subgroup being among the first subgroups, the fourth identification term being among the third identification terms.

In one embodiment, the generating unit 45 is configured to combine two or more first identification terms to generate the first statements in compliance with one or more statement rules related to the first voice input commands. For example, the configuring unit 43 also is configured to configure the first voice input commands for the first statements in compliance with the statement rules related to the first voice input commands. In another example, the receiving unit 46 is configured to receive voice information input by a user, the voice information including one or more target terms. In yet another example, the acquiring unit 47 is configured to acquire one or more second identification terms corresponding to the target terms in the voice information based on at least information associated with the first mapping relation table.

In another embodiment, the combining unit 48 is configured to combine the second identification terms corresponding to the target terms to generate one or more second statements. For example, the executing unit 49 is configured to acquire one or more second voice input commands corresponding to the second statements based on at least information associated with the second mapping relation table and execute one or more operations corresponding to the second voice input commands. In another example, the acquiring unit 47 also is configured to, in response to one or more new terms being detected, acquire one or more fifth identification terms, the new terms not being associated with the first mapping relation.

In yet another embodiment, the establishing unit 41 also is configured to establish a fourth mapping relation between the new terms and the fifth identification terms. For example, the storing unit 43 also is configured to store the fourth mapping relation to the first mapping relation table. In some embodiments, the device 400 is implemented to execute the method 400.

According to one embodiment, a method is provided for configuring matching rules related to voice input commands. For example, a first mapping relation between one or more first original terms in a preset term database and one or more first identification terms is established; the first mapping relation is stored in a first mapping relation table; one or more first voice input commands are configured for the first identification terms or one or more first statements including the first identification terms; and a second mapping relation between the first identification terms or the first statements and the first voice input commands is stored into a second mapping relation table. For example, the method is implemented according to at least FIG. 1.

According to another embodiment, a device is provided for configuring matching rules related to voice input commands. The device includes: an establishing unit configured to establish a first mapping relation between one or more first original terms in a preset term database and one or more first identification terms; a storing unit configured to store the first mapping relation in a first mapping relation table; and a configuring unit configured to configure one or more first voice input commands for the first identification terms or one or more first statements including the first identification terms. The storing unit is further configured to store a second mapping relation between the first identification terms or the first statements and the first voice input commands into a second mapping relation table. For example, the device is implemented according to at least FIG. 3.

According to yet another embodiment, a non-transitory computer readable storage medium includes programming instructions for configuring matching rules related to voice input commands. The programming instructions are configured to cause one or more data processors to execute certain operations. For example, a first mapping relation between one or more first original terms in a preset term database and one or more first identification terms is established; the first mapping relation is stored in a first mapping relation table; one or more first voice input commands are configured for the first identification terms or one or more first statements including the first identification terms; and a second mapping relation between the first identification terms or the first statements and the first voice input commands is stored into a second mapping relation table. For example, the storage medium is implemented according to at least FIG. 1.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for processing one or more voice input commands, comprising:
   generating a first mapping relation between one or more first original terms in a preset term database and one or more first identification terms;
   storing the first mapping relation in a first mapping relation table;
   configuring one or more first voice input commands for the first identification terms or one or more first statements including the first identification terms;
   generating a second mapping relation between the first identification terms or the first statements and the first voice input commands;
   storing the second mapping relation in a second mapping relation table;
   receiving voice information input from a user, the voice information comprising at least one of the first original terms or at least one of the first statements; and
   executing at least one of the first voice input commands based on the voice information, the first mapping relation table, and the second mapping relation table.

2. The method of claim 1, further comprising:
   assigning the first original terms in the preset term database to one or more first term groups according to meanings of the first original terms; and
   configuring one or more second identification terms for the first term groups, wherein a first meaning similarity between the first original terms in a second term group and a third identification term configured for the second term group satisfies a preset first condition, the second term group being among the first term groups, the third identification term being among the second identification terms;
   wherein generating the first mapping relation includes:
   generating a third mapping relation between the first original terms in the second term group and the third identification term configured for the second term group.

3. The method of claim 2, further comprising:
   assigning the first original terms in the preset term database to one or more third term groups according to parts of speech related to the first original terms, wherein parts of speech of one or more second original terms in a fourth term group are the same, the fourth term group being among the third term groups;
   wherein the assigning the first original terms in the preset term database to one or more first term groups according to meanings of the first original terms and the configuring one or more second identification terms for the first term groups include:
   dividing the second term group into one or more first subgroups according to meanings of the first original terms in the second term group; and
   configuring one or more third identification terms to the first subgroups, wherein a second meaning similarity between one or more third original terms in a second subgroup and a fourth identification term configured for the second subgroup satisfies a preset second condition, the second subgroup being among the first subgroups, the fourth identification term being among the third identification terms.

4. The method of claim 1, further comprising:
   combining two or more first identification terms to generate the first statements in compliance with one or more statement rules related to the first voice input commands;
   wherein the configuring one or more first voice input commands for one or more first statements including the first identification terms includes:
   configuring the first voice input commands for the first statements in compliance with the statement rules related to the first voice input commands.

5. The method of claim 4, the voice information including one or more target terms; the method further comprising:
   acquiring one or more second identification terms corresponding to the target terms in the voice information based on at least information associated with the first mapping relation table;
   combining the second identification terms corresponding to the target terms to generate one or more second statements;
   acquiring one or more second voice input commands corresponding to the second statements based on at least information associated with the second mapping relation table; and
   executing one or more operations corresponding to the second voice input commands.

6. The method of claim 1, further comprising:
   in response to one or more new terms being detected,
   acquiring one or more fifth identification terms, the new terms not being associated with the first mapping relation;
   establishing a fourth mapping relation between the new terms and the fifth identification terms; and
   storing the fourth mapping relation to the first mapping relation table.

7. The method of claim 1, wherein the configuring one or more first voice input commands for the first identification terms or one or more first statements including the first identification terms includes:

configuring the first voice input commands for the first identification terms and the first statements including the first identification terms.

8. A device for processing one or more voice input commands, comprising:
one or more data processors;
a computer-readable storage medium;
an establishing unit configured to generate a first mapping relation between one or more first original terms in a preset term database and one or more first identification terms;
a storing unit configured to store the first mapping relation in a first mapping relation table;
a configuring unit configured to configure one or more first voice input commands for the first identification terms or one or more first statements including the first identification terms;
wherein the establishing unit is further configured to generate a second mapping relation between the first identification terms or the first statements and the first voice input commands;
wherein the storing unit is further configured to store the second mapping relation into a second mapping relation table;
a receiving unit configured to receive voice information input from a user, the voice information comprising at least one of the first original terms or at least one of the first statements; and
an executing unit configured to execute at least one of the first voice commands based on the voice information, the first mapping table, and the second mapping table;
wherein the establishing unit, the storing unit, the configuring unit, the receiving unit, and the executing unit are stored in the storage medium and configured to be executed by the one or more data processors.

9. The device of claim 8, further comprising:
a grouping unit configured to assign the first original terms in the preset term database to one or more first term groups according to meanings of the first original terms and configure one or more second identification terms for the first term groups, wherein a first meaning similarity between the first original terms in a second term group and a third identification term configured for the second term group satisfies a preset first condition, the second term group being among the first term groups, the third identification term being among the second identification terms;
wherein the establishing unit is further configured to generate a third mapping relation between the first original terms in the second term group and the third identification term configured for the second term group.

10. The device of claim 9, wherein:
the grouping unit is further configured to assign the first original terms in the preset term database to one or more third term groups according to parts of speech related to the first original terms, wherein parts of speech of one or more second original terms in a fourth term group are the same, the fourth term group being among the third term groups; and
the grouping unit is further configured to divide the second term group into one or more first subgroups according to meanings of the first original terms in the second term group and configure one or more third identification terms to the first subgroups, wherein a second meaning similarity between one or more third original terms in a second subgroup and a fourth identification term configured for the second subgroup satisfies a preset second condition, the second subgroup being among the first subgroups, the fourth identification term being among the third identification terms.

11. The device of claim 8, further comprising:
a generating unit configured to combine two or more first identification terms to generate the first statements in compliance with one or more statement rules related to the first voice input commands;
wherein the configuring unit is further configured to configure the first voice input commands for the first statements in compliance with the statement rules related to the first voice input commands.

12. The device of claim 11, the voice information including one or more target terms, the device further comprising:
an acquiring unit configured to acquire one or more second identification terms corresponding to the target terms in the voice information based on at least information associated with the first mapping relation table; and
a combining unit configured to combine the second identification terms corresponding to the target terms to generate one or more second statements;
wherein the executing unit further is configured to acquire one or more second voice input commands corresponding to the second statements based on at least information associated with the second mapping relation table and execute one or more operations corresponding to the second voice input commands.

13. The device of claim 8, wherein:
the acquiring unit is further configured to, in response to one or more new terms being detected, acquire one or more fifth identification terms, the new terms not being associated with the first mapping relation;
the establishing unit is further configured to establish a fourth mapping relation between the new terms and the fifth identification terms; and
the storing unit is also configured to store the fourth mapping relation to the first mapping relation table.

14. The device of claim 11, wherein:
the configuring unit is configured to configure the first voice input commands for the first identification terms and the first statements including the first identification terms; and
the establishing unit is further configured to generate the second mapping relation between the first identification terms and the first voice input commands and between the first statements and the first voice input commands.

15. A non-transitory computer readable storage medium comprising programming instructions for processing one or more voice input commands, the programming instructions configured to cause one or more data processors to execute operations comprising:
generating a first mapping relation between one or more first original terms in a preset term database and one or more first identification terms;
storing the first mapping relation in a first mapping relation table;
configuring one or more first voice input commands for the first identification terms or one or more first statements including the first identification terms;
generating a second mapping relation between the first identification terms or the first statements and the first voice input commands into a second mapping relation table;
storing the second mapping relation in a second mapping relation table;

receiving voice information input from a user, the voice information comprising at least one of the first original terms or at least one of the first statements; and executing at least one of the first voice input commands based on the voice information, the first mapping relation table, and the second mapping relation table.

* * * * *